(12) United States Patent
Janky et al.

(10) Patent No.: US 7,020,555 B1
(45) Date of Patent: Mar. 28, 2006

(54) SUBSCRIPTION GPS INFORMATION SERVICE SYSTEM

(75) Inventors: James M. Janky, Los Altos, CA (US); David G. Bird, Thornton, CO (US); Ann Ciganer, San Mateo, CA (US)

(73) Assignee: Trimble Navigation Limited, Sunnyvale, CA (US)

(*) Notice: Subject to any disclaimer, the term of this patent is extended or adjusted under 35 U.S.C. 154(b) by 222 days.

(21) Appl. No.: 10/744,925

(22) Filed: Dec. 23, 2003

(51) Int. Cl.
*H04B 7/185* (2006.01)
*G01S 5/02* (2006.01)
*G01C 21/00* (2006.01)

(52) U.S. Cl. ............. 701/213; 701/214; 342/358; 342/357.12

(58) Field of Classification Search .......... 701/213, 701/214, 215; 342/358, 357.03, 357.12; 705/51; 713/153, 160, 161, 163; 455/12.1, 455/456.3; 340/539.13, 539.23
See application file for complete search history.

(56) References Cited

U.S. PATENT DOCUMENTS

| | | | |
|---|---|---|---|
| 5,365,450 A | 11/1994 | Schuchman et al. | 364/449 |
| 5,717,403 A * | 2/1998 | Nelson et al. | 342/357.12 |
| 5,841,396 A | 11/1998 | Krasner | 342/357 |
| 6,100,842 A * | 8/2000 | Dreier et al. | 342/357.08 |
| 6,208,291 B1 | 3/2001 | Krasner | 342/357.12 |
| 6,323,803 B1 * | 11/2001 | Jolley et al. | 342/357.03 |
| 6,664,922 B1 * | 12/2003 | Fan | 342/357.1 |
| 6,778,136 B1 * | 8/2004 | Gronemeyer | 342/357.15 |
| 6,816,090 B1 * | 11/2004 | Teckchandani et al. | 340/989 |
| 6,853,916 B1 * | 2/2005 | Fuchs et al. | 701/213 |
| 6,879,283 B1 * | 4/2005 | Bird et al. | 342/357.03 |
| 6,941,225 B1 * | 9/2005 | Upadhyaya et al. | 701/213 |

OTHER PUBLICATIONS

Nicholas Talbot, Gang Lu, Timo Allison & Ulrich Vollath, "Broadcast Network RTK—Transmission Standards and Results", Institute of Navigation (ION) GPS 2002, Sep. 24-27, 2002, Portland, OR, pp. 2379-2387.

Herbert Landau, Ulrich Vollath & Xiaoming Chen, "Virtual Reference Station Systems", Journal of Global Positioning Systems (2002), vol. 1, No. 2, pp. 137-143, month is not available.

Ulrich Vollath, Alois Buecherl, Herbert Landau, Christian Pagels & Bernhard Wagner, "Multi-Base RTK Positioning Using Virtual Reference Stations", Spectra Precision Terrsay GmgH, month and date are not available.

* cited by examiner

*Primary Examiner*—Tan Q. Nguyen
(74) *Attorney, Agent, or Firm*—Menlo Patent Agency LLC; David R. Gildea (57) ABSTRACT

A GPS information service system for providing supplemental GPS correction and signal acquisition information to subscribers. A GPS information server broadcasts GPS aiding information encrypted with subscription keys. A remote GPS subscription unit receives the key enablers for the subscription keys in service activation (SAM) messages for the services for which they have subscribed and then uses the subscription keys to decrypt the GPS aiding information. In order to prevent unauthorized access to the information, unsymmetrical signature generation and authentication algorithms are used for generating and authenticating signatures for the SAM messages.

22 Claims, 4 Drawing Sheets

SUBSCRIPTION GPS INFORMATION SERVICE SYSTEM

BACKGROUND OF THE INVENTION

1. Field of the Invention

The invention relates generally to the global positioning system (GPS) and more particularly to a GPS information service system for providing GPS location correction and signal acquisition information based upon subscriptions.

2. Description of the Prior Art

The global positioning system (GPS) is used as the basis for many navigation, tracking, survey, geographical information system (GIS), and personal location applications. However, it is not unusual for specialized GPS aiding information to be desired or even required to supplement the GPS system for a particular application. For example, survey and GIS systems require carrier phase or pseudorange correction information to achieve a higher level of precision than can be directly obtained from the GPS system. Personal location systems may require assistance in order to achieve the signal sensitivity that is needed for signal acquisition in indoor locations.

Most applications of GPS can benefit from GPS acquisition information for faster signal acquisition. Unfortunately, the services for providing GPS aiding information are limited to specific types of information for specific types of GPS receivers. There is no existing method or apparatus for providing the broad range of supplemental GPS aiding information that is desired or needed by the various types of GPS receivers for the various applications.

SUMMARY OF THE INVENTION

Briefly, the present invention is a GPS information service system for providing GPS location correction and signal acquisition information to subscribers. The correction information includes GPS carrier phases for real time kinematic (RTK) systems and GPS pseudorange corrections for differential GPS (DGPS) systems. The acquisition information includes frequency, time, location, satellite orbital parameters, and GPS data bit sequences. In a preferred embodiment, a GPS information server broadcasts a radio signal having the GPS aiding information encrypted with subscription keys. A remote GPS subscription unit has possession of the subscription keys but is not able to use them without key enablers. The key enablers are provided in a radio signal having service activation (SAM) messages having signatures derived from the messages and identifications corresponding to the remote subscription units. All the remote GPS subscription units receive the SAM messages. However, a remote GPS subscription unit can only read a key enabler when it has authenticated the signature for its own identification. In order to prevent unauthorized use, unsymmetrical algorithms are used for deriving and then authenticating the signatures. The remote GPS subscription unit then uses the key enablers for activating the subscription keys to decrypt the items GPS aiding information for which it has subscribed.

A benefit of the GPS information service system of the present invention is that many types of GPS receivers for many different GPS-based applications can use the same system to mix and match portions of a broad range of supplemental GPS aiding information in a cost effective way. A further benefit is that the operator of the system of the present invention is not required to predict which portions of the GPS aiding information will be required or desired by an as yet, undeveloped, application of the GPS system. A further benefit is that additional GPS aiding information can be added at a future date within the structure of the present invention.

Various other embodiments and benefits of the present invention will no doubt become obvious to those of ordinary skill in the art after viewing the drawing figures and reading the detailed description below.

DETAILED DESCRIPTION OF THE PREFERRED EMBODIMENTS

Figure 1:
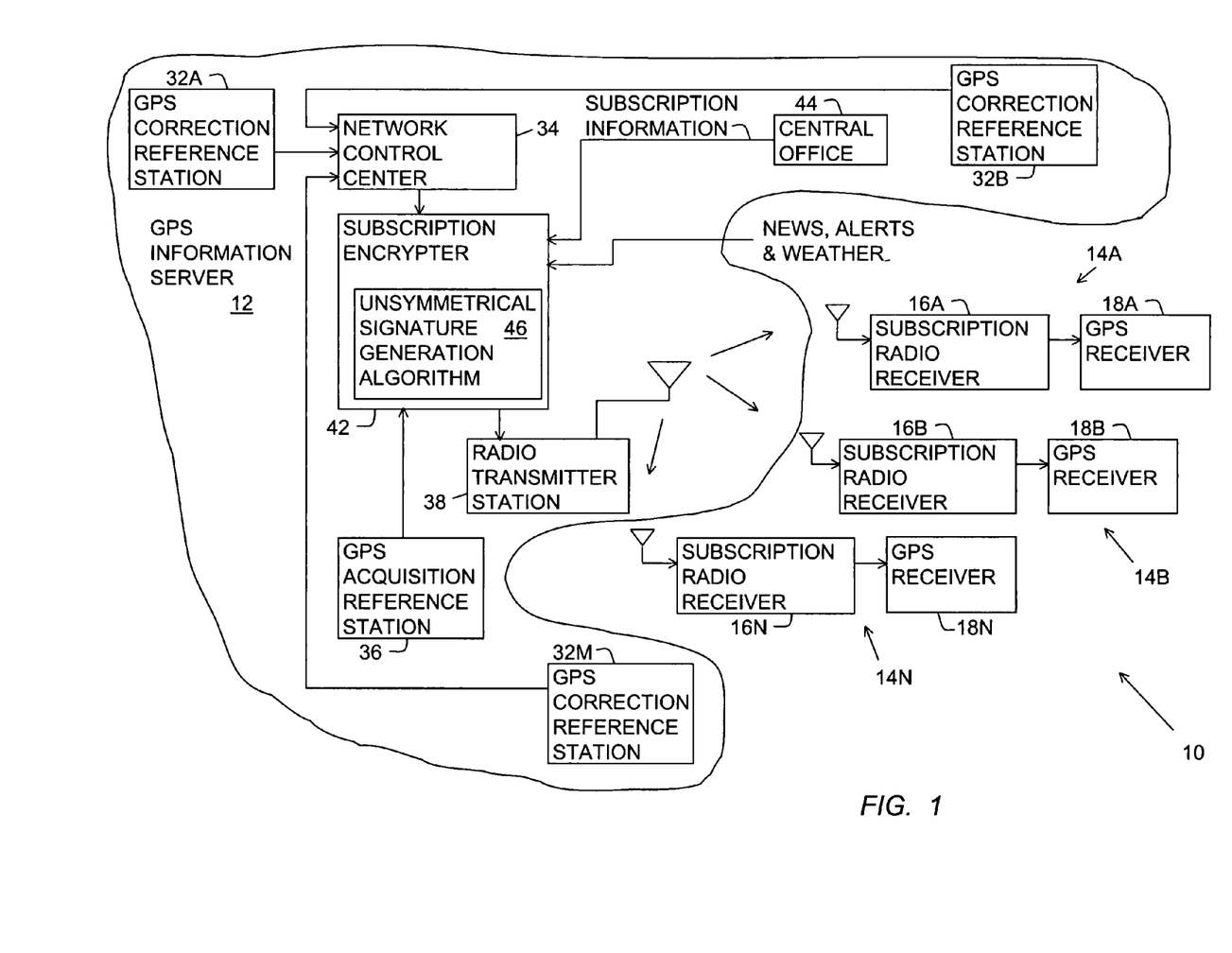
FIG. 1 is a block diagram of a GPS information service system of the present invention.

FIG. 1 is a block diagram of a global positioning system (GPS) information service system of the present invention referred to with a reference number 10. The system 10 includes a GPS information server 12 and several remote GPS subscription units 14A, 14B through 14N. The GPS information server 12 supplements the GPS system for providing a subscription-based GPS service for GPS location correction and GPS signal acquisition information.

The remote GPS subscription units 14A, 14B through 14N include subscription radio receivers 16A, 16B through 16N, respectively, coupled to GPS receivers 18A, 18B through 18N, respectively. All of the GPS information for both location correction and signal acquisition is broadcast in a single GPS aiding radio signal from the GPS information server 12 to the subscription radio receivers 16A–N. For the purpose of this application the single GPS aiding radio signal is a radio signal for a radio communication channel having known signal characteristics such as carrier frequency, modulation, encoding, and the like. Different GPS aiding information may be transmitted over the radio communication channel at different times with or without breaks in the signal energy.

The owners or users of the remote GPS subscription units 14A–N subscribe with the owner or operator of the GPS information server 12 for specific GPS aids for improving the accuracy of position estimates or reducing the signal acquisition time of the GPS receivers 18A–N. Information for the particular GPS aids for which the remote GPS subscription units 14A–N have subscribed is carried in subscription information. The subscription information may be received by the GPS information server 12 by mail, voice telephone, email, a website, hand carrying, or any other way.

Importantly, all the subscription radio receivers 16A–N can have similar constructions in order to receive the same radio signals broadcast by the GPS information server 12 and decode the GPS aiding information for which they have subscriptions. However, there may be a great variety of different constructions for the GPS receivers 18A–N for navigation, tracking, mapping, survey, geographical information system (GIS), search and rescue, agricultural, machine control, event marking, asset management, personal location, and the like. Although the present invention is described in terms of radio signals it should be understood that wired signals could be broadcast by the GPS information server 12 and received by the remote GPS subscription units 14A–N in place of the radio signals.

The GPS information server 12 includes one or more geographically spaced GPS correction reference stations 32A, 32B through 32M, a network control center 34, a GPS acquisition reference station 36, a radio transmitter station 38, a subscription encrypter 42, and a central office 44. The radio signals are only required to operate one-way from the GPS information server 12 to the remote GPS subscription units 14A–N. In a preferred embodiment, the radio transmitter station 38 is a paging transmitter station for a high data rate paging radio signal. However, several other types of broadcast systems including cellular radio services can be used.

The GPS correction reference stations 32A–M receive the GPS signal at surveyed or otherwise accurately known geographical locations for determining GPS correction information corresponding to their respective known geographical locations. The GPS correction information can be used for improving the accuracy of a GPS-based location or position estimate beyond the level of accuracy that can be directly determined from the GPS signal. The GPS correction reference stations 32A–M pass the GPS correction information to the network control center 34. The network control center 34 processes the GPS correction information and passes it to the subscription encoder 42. The subscription encoder 42 encrypts the GPS correction information and passes it on to the radio transmitter station 38. The radio transmitter station 38 broadcasts the GPS correction information along with GPS acquisition information to the remote GPS subscription units 14A–N.

There are two forms for the GPS correction information—pseudorange and carrier phase. The pseudorange information is used for differential GPS (DGPS) systems having location or position estimates having accuracies in a range of ten centimeters to a few meters. DGPS is commonly used in agricultural, machine control and mapping and geographical information (GIS) systems. The carrier phase information is used for real time kinematic (RTK) systems with GPS-based location or position estimates having accuracies in the range of a few millimeters to a few tens of centimeters depending mostly upon the length of a base line. Surveyors typically require these accuracies.

For DGPS location corrections, the GPS correction reference stations 32A–M use their own accurately known locations with the received GPS signal for determining pseudorange location correction information for their respective locations. The pseudorange correction information is passed to the network control center 34. The network control center 34 processes the pseudorange correction information according to the locations of the GPS correction reference stations 32A–M for determining location correction information for a virtual reference station. The virtual reference station has a selected (virtual) geographical location. The selected virtual geographical location may be anywhere in the vicinity of the GPS reference stations 32A–M and is usually centrally located within the area of the expected geographical locations for the remote GPS subscription units 14A–N. In most cases this is the geographical location of the radio transmitter station 38. The virtual reference station is sometimes known as a "VRS".

Two types of carrier phase location corrections are provided—a virtual fixed reference location correction and a virtual mobile reference location correction. For the virtual fixed reference, the network control center 34 processes the carrier phase information and the accurately known locations of the GPS correction reference stations 32A–M for determining carrier phase correction information for the geographical location of the virtual reference station. Importantly, the geographical location of the virtual reference station does not need survey type accuracy for the system 10 to provide survey accuracy location correction information. For the local remote reference, the carrier phase correction information from the GPS correction reference stations 32A–M is passed on to the remote GPS subscription units 14A–N. The remote GPS subscription unit 14A–N processes the locally received GPS signal, the carrier phase correction information and the accurately known locations of the GPS correction reference stations 32A–M for accurately estimating its own remote location. In this way the remote GPS subscription unit 14A–N acts as its own virtual reference station.

The GPS acquisition reference station 36 uses the GPS signal for determining GPS acquisition information that can be used by another GPS receiver for faster signal acquisition and/or acquisition of lower level signals. The GPS acquisition information includes GPS-based frequency and time and the ephemeris, almanac, health and other data for the GPS satellites. A sequence of received GPS data bits for a past time or a sequence of GPS data bits expected at a future time may also be included in the GPS acquisition information.

The subscription encrypter 42 receives the GPS location correction information from the network control center 34 and receives the GPS acquisition information from the GPS acquisition reference station 36 either directly or through the network control center 34. The subscription encrypter 42 may also receive news, alerts and weather (NAW) information from the internet or other source. The users or owners of the remote GPS subscription units 14A–N subscribe with the central office 44 for portions of the NAW and GPS information. The central office 44 passes the subscription information to the subscription encrypter 42. The telephone system or other wide area network using either direct line, radio signal, or internet can be used for digital communication among the GPS correction reference stations 32A–M, the network control center 34, the subscription encoder 42, the GPS acquisition reference station 36, the central office 44, and the radio transmitter station 38. Alternatively, any grouping of the network control center 34, the subscription encoder 42, the GPS acquisition reference station 36, the central office 44, the radio transmitter station 38 and GPS correction reference stations 32A–M (with the restriction that the GPS correction reference stations 32A–M must be spaced from each other) may be co-located and have direct digital communication without use of telephone or other wide area network.

The subscription encrypter 42 encrypts the GPS (and NAW if available) message information with subscription keys in separate parts and passes the encrypted message information to the radio transmitter station 38. The radio transmitter station 38 broadcasts the GPS aiding information radio signal having the encrypted message information. The remote GPS subscription units 14A–N are enabled to use the subscription keys for the parts or portions of the message information for which they have subscribed. All of the subscription radio receivers 16A–N receive the radio signal. But each remote subscription unit 14A–N can only decrypt the GPS information for which it is enabled.

Two types of messages are provided by the radio signals—service activation (SAM) messages and GPS information messages. The SAM messages enable or disable subscription keys for the remote GPS subscription units 14A–N. The enabled subscription keys are then used to decrypt the service for the portions of the GPS information messages which the users or owners of the remote subscription units 14A–N have procured.

Signatures are included in the SAM messages that are derived from the messages themselves and identification keys corresponding to identifications that are built into the subscription radio receivers 16A–N. The subscription radio receiver 16A–N determines when it is authorized to read the SAM message by using its identification to authenticate the signature. Authenticating the signature enables the subscription radio receiver 16A–N to decrypt key enablers in the SAM message. In order to prevent a user from spoofing a SAM message, and thereby getting a free subscription, an unsymmetrical signature generation algorithm 46 is used. That is, the algorithm 46 for generating the signatures cannot be discovered within reasonable limits of computing time from the algorithm for authenticating the signature. This unsymmetrical algorithm 46 makes it difficult for unauthorized users to generate the correct signatures for the key enablers for their identifications.

The SAM messages include the following:

SAM1) Turn on a designated service until a designated date. This message enables the remote subscription unit 14A–N to decrypt the designated GPS aiding information until the designated date.

SAM2) Turn off a designated service. This message disables the remote subscription unit 14A–N from decrypting the designated GPS aiding information.

SAM3) Turn on a designated run time for a designated service. This message enables the remote subscription unit 14A–N to decrypt the designated GPS aiding information for a designated time of use. The remote subscription unit 14A–N is equipped to start and stop a down counter to measure the run time. This enables the remote subscription unit 14A–N to subscribe for service-by-the-minute, hour, day, week, month or year.

SAM4) Current date. This message is broadcast periodically. The remote subscription unit 14A–N uses the current date message to turn off a service when a designated date arrives. Alternatively, the remote subscription unit 14A–N is equipped to use the date information determined from the GPS signal by the GPS receiver 18A–N.

GPS aiding information service for individual items or portions of the GPS location correction and signal acquisition information are separately keyed as described below. It is not expected that any one remote subscription unit 14A–N would need to be enabled for all the subscriptions keys, thereby making it possible for the subscribers to pay only for the parts of the GPS aiding information that they individually need. Preferably, the subscription keys are generated in a manner that is time or date dependent so that the remote subscription unit 14A–N cannot continue a subscription indefinitely by ignoring current SAM messages. The items of GPS aiding information include the following:

GPS1) Location correction information having pseudorange corrections for differential global positioning systems (DGPS). The correction information includes the virtual reference station pseudorange corrections provided by the network control center 34 based upon the locations and location corrections from the GPS correction reference stations 32A–M.

GPS2) Location correction information having GPS carrier phase information for real time kinematic (RTK) systems. The correction information includes the virtual reference station carrier phase information provided by the network control center 34 based upon the locations and location corrections from the GPS correction reference stations 32A–M.

GPS3) Location correction information having GPS carrier phase information for real time kinematic (RTK) systems. The correction information includes the locations and the location corrections from the GPS correction reference stations 32A–M. The remote subscription units 14A–N effectively become their own virtual reference stations.

GPS4) Acquisition information for precise frequency. The accurate frequency is provided in the carrier frequency of the broadcast radio signal by the radio transmitter station 38. The GPS receiver 18A–N must be equipped with hardware for using the radio signal frequency for correcting or compensating its internal reference frequency.

GPS5) Acquisition information for satellite Doppler shift. The GPS receiver 18A–N adjusts its internal reference frequency with the Doppler shifts.

GPS6) Acquisition information for the GPS satellite almanac orbit coefficients.

GPS7) Acquisition information for an approximate time (a few seconds).

GPS8) Acquisition information for an approximate location (a few tens of kilometers). The approximate location may be the location of the radio transmitter station 38.

GPS9) Acquisition information for GPS satellite health.

GPS10) Acquisition information for precise time (a few hundred microseconds or better). The GPS receiver 18A–N may use the precise time for reducing the number of code phases that must be evaluated for determining if GPS signal energy from a given GPS satellite is present or not.

GPS11) Acquisition information for current GPS satellite ephemeris orbit coefficients.

GPS12) Acquisition information for a GPS data bit sequence expected at a designated future time. The GPS receiver 18A–N uses the values or senses in the GPS data bit sequence for inverting or non-inverting GPS signal code correlations in order to extend the time period of coherent integration of the GPS signal, thereby enabling the GPS receiver 18A–N to acquire a lower level GPS signal.

GPS13) Acquisition information for a GPS data bit sequence received at a designated past time. The GPS receiver 18A–N stores GPS signal samples for some time period greater than a GPS data bit. The GPS receiver 18A–N then uses the values or senses of the GPS data bit sequence for inverting or non-inverting GPS signal code correlations from the stored GPS signal samples in order to extend the time period for coherent integration of the GPS signal, thereby enabling the GPS receiver 18A–N to acquire a lower level GPS signal.

GPS14) Acquisition information for accurate time (ten milliseconds or better). The accurate time may be used with the received or expected GPS data bit sequences.

The news, alerts and weather (NAW) messages may include commodity prices, stock prices, text messages, conventional paging messages, telephone numbers to call, weather forecasts and storm warnings.

Figure 2:
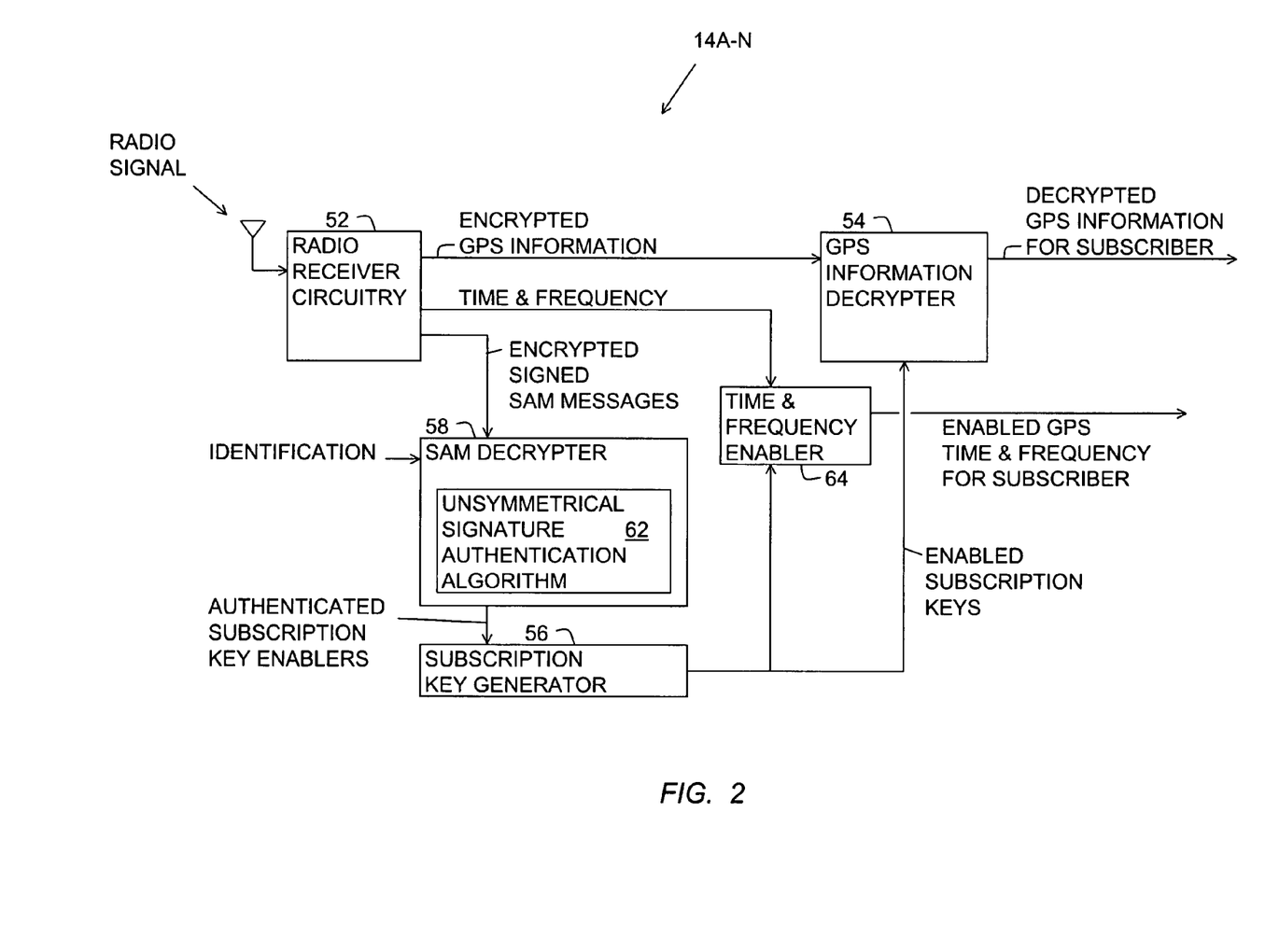
FIG. 2 is a block diagram of a remote GPS subscription unit of the system of FIG. 1.

FIG. 2 is a block diagram of the remote GPS subscription unit 14A–N showing radio receiver circuitry 52, a GPS information decrypter 54, a subscription key generator 56, a SAM decrypter 58, and a time & frequency enabler 64. The radio receiver circuitry 52 converts the radio signals received from the radio transmitter station 38 (FIG. 1) to digital signals having encrypted signed service activation (SAM) messages and encrypted GPS aiding information messages described above. The GPS information decrypter 54 uses subscription keys from the subscription key generator 56 for decrypting the GPS aiding information messages and providing decrypted GPS aiding information for use in the GPS receiver 18A–N.

The SAM decrypter 58 includes an unsymmetrical signature authentication algorithm 62. The SAM decrypter 58 decrypts the SAM messages and the unsymmetrical signature authentication algorithm 62 uses the identification of the subscription radio receiver 16A–N for verifying (authenticating) the signature. When the signature is authenticated the key enablers in the SAM messages are passed to the subscription key generator 56. The subscription key generator 56 generates the subscription keys that have been enabled and passes the enabled subscription keys to the GPS information decrypter 54.

The radio receiver circuitry 52 also provides time and frequency information from time ticks and the carrier frequency in the radio signal. The time & frequency enabler 64 uses enabled subscription keys from the subscription key generator 56 for issuing the GPS acquisition information for precise time and frequency to the GPS receiver 18A–N.

Figure 3:
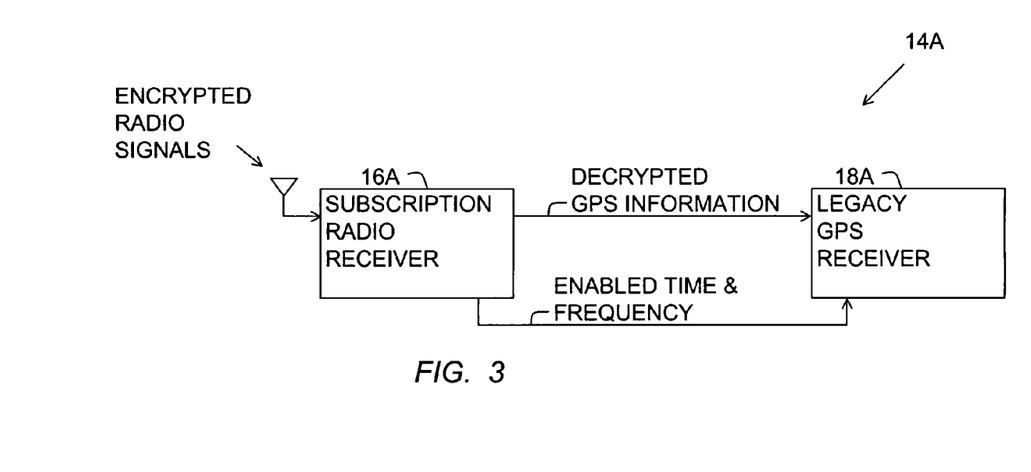
FIGS. 3 and 4 are block diagrams of first and second embodiments, respectively, of subscription radio receivers and GPS receivers for the remote GPS subscription unit of FIG. 2.

FIG. 3 is a block diagram of a first embodiment of the remote GPS subscription unit 14A–N referred to with the reference identifier 14A. The remote GPS subscription unit 14A includes the subscription radio receiver 16A and the GPS receiver 18A. The subscription radio receiver 16A includes the radio receiver circuitry 52, the GPS information decrypter 54, the subscription key generator 56, the SAM decrypter 58, and the time & frequency enabler 64. The GPS receiver 18A is termed a legacy GPS receiver because GPS receivers that preexist the present invention are not required to be modified to operate with the GPS information server system 10 of the present invention.

Figure 4:
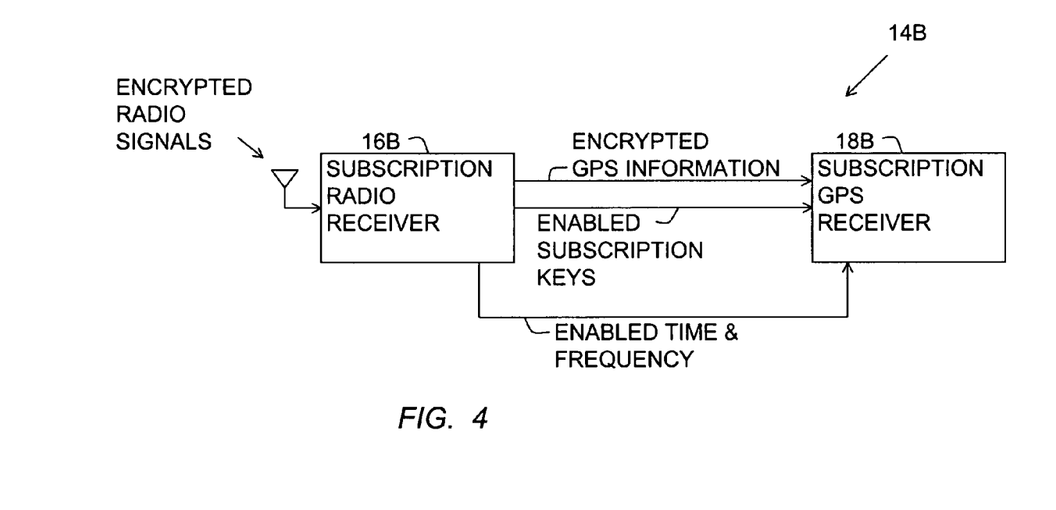

FIG. 4 is a block diagram of a second embodiment of the remote GPS subscription unit 14A–N referred to with the reference identifier 14B. The remote GPS subscription unit 14B includes the subscription radio receiver 16B and the GPS receiver 18B. The subscription radio receiver 16A includes the radio receiver circuitry 52, the subscription key generator 56, the SAM decrypter 58, and the time & frequency enabler 64. The GPS receiver 18A includes the GPS information decrypter 54. The GPS receiver 18B is termed a subscription GPS receiver because it is originally constructed to be used with the system 10.

It should be noted that the subscription radio receivers 16A,B are "trusted" for one-way confidential information. That is, the receivers 16A,B have built-in capability of using information received in the SAM messages for generating the subscription keys for decrypting the GPS information messages. The GPS receivers 18A,B are "untrusted" in that they do not have this capability. It should be noted that the untrusted GPS receiver 18B requires the subscription keys from the trusted subscription radio receiver 16B in order to use its internal GPS information decrypter 54.

Figure 5:
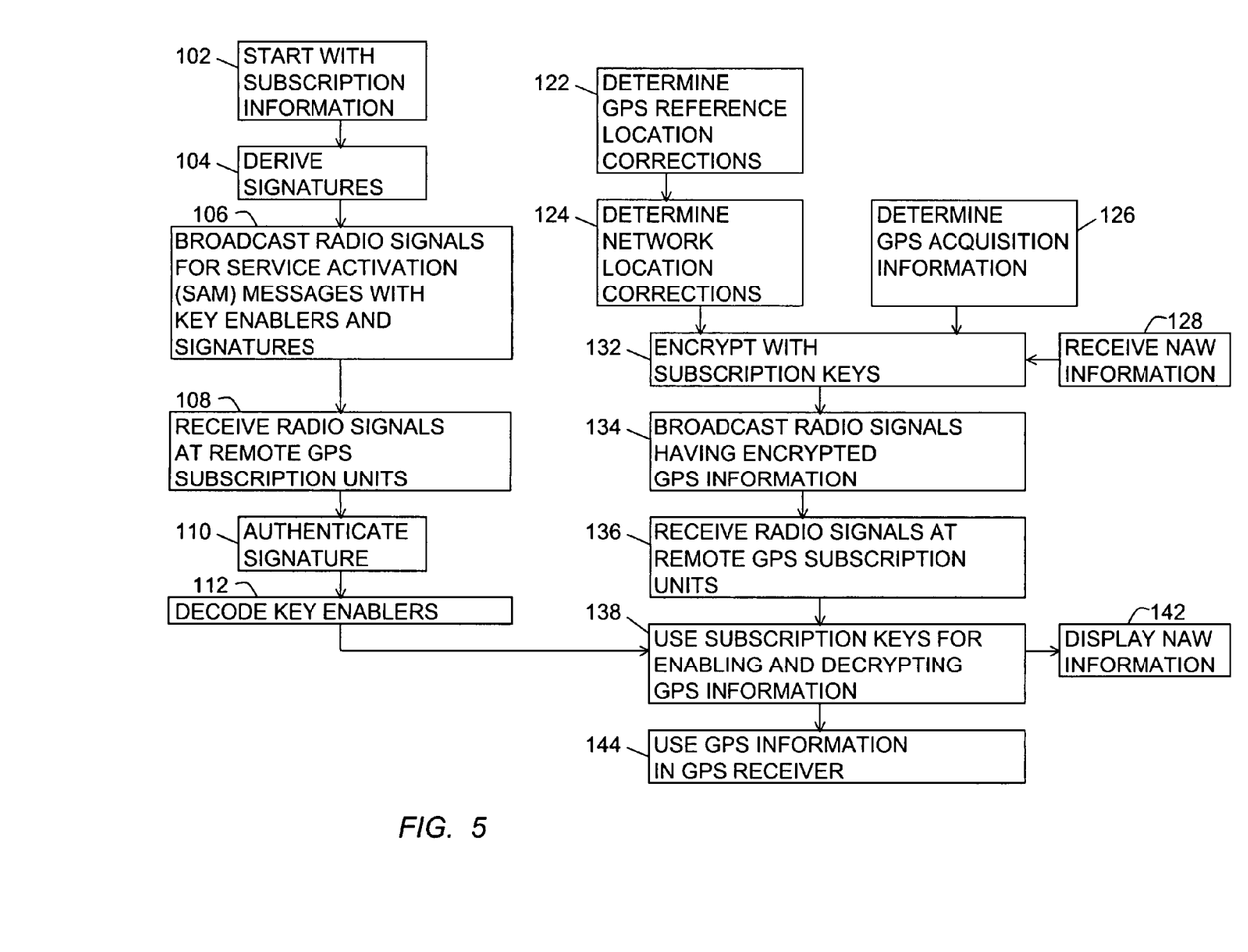
FIG. 5 is a flow chart of the operation of the system of FIG. 1.

FIG. 5 is a flow chart of the operation of the GPS information service system 10. In a step 102 the system 10 starts with the subscription information for the remote GPS subscription units 14A–N. In a step 104 the subscription encrypter 42 uses the unsymmetrical algorithm 46 for deriving signatures for the SAM messages and identifications for enabling and disabling the subscription keys in the remote GPS subscription units 14A–N. In a step 106 the radio transmitter station 38 broadcasts SAM radio signals having the signed SAM messages.

The remote GPS subscription units 14A–N in a step 108 receive the SAM radio signals. In a step 110 the remote GPS subscription units 14A–N use their identifications to authenticate the signatures and access SAM messages to enable the services for which they have subscribed. In a step 112 the remote GPS subscription units 14A–N decode the key enablers for which they have subscriptions. It should be noted that the steps 102–112 continue in a background mode during the lifetime GPS information service system 10.

The GPS correction reference stations 32A–M in a step 122 receive the GPS signal and determine location corrections for their own locations. In a step 124 the network control center 34 receives the reference location corrections and determines network location corrections for a virtual reference station. In a step 126 the GPS acquisition reference station 36 receives the GPS signal and determines GPS signal acquisition information. In a step 128 the subscription encrypter 42 receives the news, alerts and weather (NAW) from the internet or other sources. In a step 132 the subscription encrypter 42 uses the subscription keys for encrypting the location correction information, the GPS signal acquisition information, and the NAW information.

The radio transmitter station 38 in a step 134 broadcasts the GPS aiding information radio signals having the encrypted GPS information messages. In a step 136 the remote GPS subscription units 14A–N receive the GPS aiding information radio signals. In a step 138 the remote GPS subscription units 14A–N use the subscription keys that have been enabled from the SAM messages to enable and decrypt the GPS information for which they have subscribed. It should be noted that the steps 122–138 may be continuing at the same time as the steps 102–112. In a step 142 the news, alerts and weather (NAW) is displayed to the user. In a step 144 GPS aiding information for which the users or owners of the remote GPS subscription units 14A–N have subscribed is used in the GPS receivers 18A–N.

U.S. Pat. No. 5,365,450 by Schuchman et al. for a "Hybrid GPS/Data Line Unit for Rapid, Precise, and Robust Position Determination", U.S. Pat. No. 5,841,396 by Krasner for a "GPS Receiver Utilizing a Communication Link" and U.S. Pat. No. 6,208,291 by Krasner for a "Highly Parallel GPS Correlator System and Method" are incorporated herein by reference.

In general, although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the claims of this application be construed as covering all embodiments as fall within the true spirit and scope of the invention.

What is claimed is:

1. A global positioning system (GPS) information server system, comprising:

at least one GPS correction reference station for generating GPS correction information for improving a GPS-based position estimate;

a GPS acquisition reference station for generating GPS acquisition information for reducing time for acquiring for GPS signal;

a transmitter station for broadcasting said GPS correction information and said GPS acquisition information in a single GPS aiding signal; and a subscription encrypter for organizing said GPS correction and acquisition information into items and encrypting said items according to subscriptions, respectively, procured for remote subscription units, said GPS aiding signal received in said remote subscription units wherein only said remote subscription units having procured said subscriptions are enabled to decrypt said items.

2. The system of claim 1, wherein:
said GPS correction and acquisition information includes both carrier phase and pseudorange correction information in said single GPS aiding signal.

3. The system of claim 2, wherein:
said GPS correction and acquisition information further includes an accurate frequency, an accurate time, and GPS satellite orbital parameters said single GPS aiding signal.

4. A global positioning system (GPS) information server system, comprising:
at least one GPS correction reference station for generating GPS correction information for improving a GPS-based position estimate;
a GPS acquisition reference station for generating GPS acquisition information for reducing time for acquiring for GPS signal;
a transmitter station for broadcasting said GPS correction information and said GPS acquisition information in a single GPS aiding signal, wherein said GPS correction and acquisition information includes a sequence of expected GPS data bits for a certain future time; and
a remote GPS subscription unit for using said sequence for coherent integration of said GPS signal over a time period greater than a GPS data bit.

5. A global positioning system (GPS) information server system, comprising:
at least one GPS correction reference station for generating GPS correction information for improving a GPS-based position estimate;
a GPS acquisition reference station for generating GPS acquisition information for reducing time for acquiring for GPS signal;
a transmitter station for broadcasting said GPS correction information and said GPS acquisition information in a single GPS aiding signal, wherein said GPS correction and acquisition information includes a sequence of GPS data bits received at a certain past time and further comprising; and
a remote GPS subscription unit for storing a representation of said GPS signal and using said sequence for coherent integration of said GPS signal representation over a time period greater than a GPS data bit.

6. A global positioning system (GPS) information server system, comprising:
at least one GPS correction reference station for generating GPS correction information for improving a GPS-based position estimate;
a GPS acquisition reference station for generating GPS acquisition information for reducing time for acquiring for GPS signal;
a transmitter station for broadcasting said GPS correction information and said GPS acquisition information in a single GPS aiding signal;
a subscription encrypter for encrypting portions of said GPS correction and acquisition information with subscription keys, respectively; and
several remote subscription units for receiving said GPS aiding signal, each having a GPS information decrypter for decrypting said portions of said GPS correction and acquisition information in said remote subscription units having possession of said respective subscription keys.

7. The system of claim 6, wherein:
the subscription encrypter generates service activation (SAM) messages having key enablers and associated identifications, said key enablers corresponding to said subscription keys and said identifications corresponding to said remote subscription units;
the transmitter station broadcasts SAM signals having said SAM messages; and
the several remote subscription units receive said SAM signals, each having a SAM decrypter for determining said key enablers only in said remote subscription units having said associated identifications.

8. The system of claim 7, wherein:
the subscription encrypter includes an unsymmetrical signature generation algorithm for deriving signatures from said SAM messages, said signatures included in said SAM messages; and
the SAM decrypter includes an unsymmetrical signature authentication algorithm for authenticating said signatures and determining said key enablers, said unsymmetrical signature generation and authentication algorithms effectively preventing said signature authentication algorithm from being used to generate said signature generation algorithm.

9. The system of claim 7, wherein:
a one of said key enablers enables a one of said subscription keys to turn on a designated portion of said GPS correction and acquisition information until a designed date.

10. The system of claim 7, wherein:
a one of said key enablers enables a one of said subscription keys to turn on a designated portion of said GPS correction and acquisition information for a designated run time.

11. The system of claim 7, wherein:
a one of said key enablers enables a one of said subscription keys to turn off a designated portion of said GPS correction and acquisition information.

12. A method for aiding the global positioning system (GPS) system, comprising:
generating GPS correction information for correcting a GPS-based position estimate;
generating GPS acquisition information for increasing speed of acquisition of a GPS signal;
broadcasting said GPS correction information and said GPS acquisition information in a single GPS aiding signal;
organizing said GPS correction and acquisition information into items;
encrypting said items according to subscriptions, respectively, procured for remote subscription units; and
receiving said GPS aiding signal in said remote subscription units but only decrypting said items in said remote subscription units having said subscriptions.

13. The method of claim 12, wherein:
said GPS correction and acquisition information includes both carrier phase and pseudorange correction information in said single GPS aiding signal.

14. The method of claim 13, wherein:
said GPS correction and acquisition information further includes an accurate frequency, an accurate time, and GPS satellite orbital parameters in said single GPS aiding signal.

15. A method for aiding the global positioning system (GPS) system, comprising:
generating GPS correction information for correcting a GPS-based position estimate;

generating GPS acquisition information for increasing speed of acquisition of a GPS signal;

broadcasting said GPS correction information and said GPS acquisition information in a single GPS aiding signal, wherein said GPS correction and acquisition information includes a sequence of expected GPS data bits for a certain future time;

using said sequence in a remote GPS receiver for coherent integration of said GPS signal over a time period greater than a GPS data bit.

16. A method for aiding the global positioning system (GPS) system, comprising:

generating GPS correction information for correcting a GPS-based position estimate;

generating GPS acquisition information for increasing speed of acquisition of a GPS signal;

broadcasting said GPS correction information and said GPS acquisition information in a single GPS aiding signal, wherein said GPS correction and acquisition information includes a sequence of GPS data bits received at a certain past time; and storing a representation of said GPS signal in a remote GPS subscription unit; and using said sequence in said remote GPS subscription unit for coherent integration of said GPS signal representation over a time period greater than a GPS data bit.

17. A method for aiding the global positioning system (GPS) system, comprising:

generating GPS correction information for correcting a GPS-based position estimate;

generating GPS acquisition information for increasing speed of acquisition of a GPS signal;

broadcasting said GPS correction information and said GPS acquisition information in a single GPS aiding signal;

encrypting portions of said GPS correction and acquisition information with subscription keys, respectively;

receiving said GPS aiding signal in several remote subscription units; and decrypting said portions of said GPS correction and acquisition information in said remote subscription units having possession of said respective subscription keys.

18. The method of claim 17, further comprising:

generating service activation (SAM) messages having key enablers and associated identifications, said key enablers corresponding to said subscription keys and said identifications corresponding to said remote subscription units;

broadcasting SAM signals having said SAM messages;

receiving said SAM signals in said several remote subscription units; and determining said key enablers only in said remote subscription units having said associated identifications.

19. The method of claim 17, wherein:

generating said SAM messages includes using an unsymmetrical signature generation algorithm for deriving signatures from said SAM messages and including said signatures in said SAM messages; and determining said key enablers includes authenticating said signatures using an unsymmetrical signature authentication algorithm, said unsymmetrical signature generation and authentication algorithms effectively preventing said signature authentication algorithm from being used to generate said signature generation algorithm.

20. The method of claim 17, wherein:

a one of said key enablers enables a one of said subscription keys to turn on a designated portion of said GPS correction and acquisition information until a designed date.

21. The method of claim 17, wherein:

a one of said key enablers enables a one of said subscription keys to turn on a designated portion of said GPS correction and acquisition information for a designated run time.

22. The method of claim 17, wherein:

a one of said key enablers enables a one of said subscription keys to turn off a designated portion of said GPS correction and acquisition information.

* * * * *